UNITED STATES PATENT OFFICE.

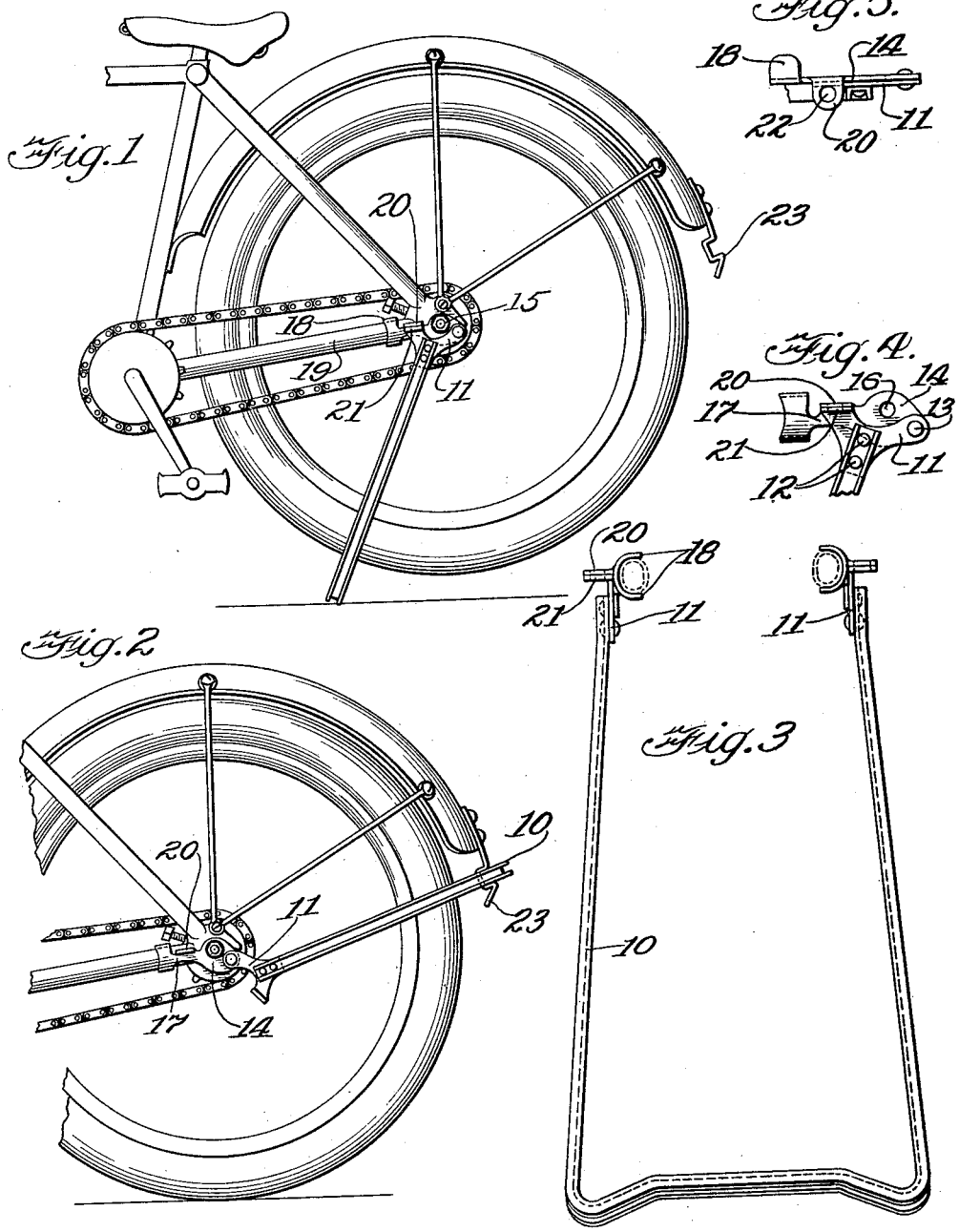

FRANK L. EILER, OF CHICAGO, ILLINOIS, ASSIGNOR TO SEARS, ROEBUCK AND COMPANY, OF CHICAGO, ILLINOIS, A CORPORATION OF NEW YORK.

ATTACHMENT FOR BICYCLES AND MOTOR-CYCLES.

1,126,964.     Specification of Letters Patent.     Patented Feb. 2, 1915.

Application filed January 2, 1913. Serial No. 739,584.

*To all whom it may concern:*

Be it known that I, FRANK L. EILER, a citizen of the United States, residing at Chicago, in the county of Cook and State of Illinois, have invented certain new and useful Improvements in Attachments for Bicycles and Motor-Cycles, of which the following is a specification.

This invention relates to an attachment to be applied to bicycles or motorcycles, for supporting the machine when not in use, and for locking it so that it cannot be used without first being unlocked.

One object of the invention is the production of an improved attachment which is light and strong, and which may be very cheaply manufactured.

Another object is to provide a support that may be conveniently attached to any ordinary bicycle or motorcycle.

A further object is to provide simple means whereby the machine may be securely locked to prevent unauthorized use thereof.

In the accompanying drawings, Figure 1 is a side view of the rear portion of a bicycle having mounted thereon an attachment which embodies the features of my invention, the support being shown in operative position. Fig. 2 is a similar view showing the support in its raised or inoperative position. Fig. 3 is a front elevation of the complete attachment. Fig. 4 is an enlarged fragmental side view of the upper end of the device, and Fig. 5 is a top plan view or end view of one of the side members.

In the preferred embodiment, which I have herein shown, the atachment comprises a U-shaped bar 10 which may be constructed of any suitable material, such as channel iron. To the upper ends of this bar are secured two plates 11 each providing oppositely extending ears. The plates 11 may be secured to the bar 10 in any suitable way, as by means of rivets 12. A pair of attaching plates 14 are arranged to be immovably secured to the machine at opposite sides of the wheel, the means employed in the present instance comprising the axle of the wheel which is arranged to extend through an opening 16 in each plate 14, the nuts 15 being threaded on the axle to hold the plates in place. The rearwardly extending ears of the plates 11 are pivoted at 13 to the plates 14. On a forwardly projecting arm 17 of the plate 14 are ears 18 which are adapted to embrace the bar 19 of the frame of the machine to prevent rotation of the plate 14 on the axle.

Projecting outwardly from the arm 17 of each plate 14 is a lug 20; and projecting outwardly from the forward end of each piece 11 is a corresponding lug 21. When the machine is not in use, the support is turned under the wheel, as shown in Fig. 1, in order to prevent the machine from tipping sidewise when in this position. The two lugs on each side abut against each other and prevent further forward movement of the support. Each of these lugs on one side of the machine is provided with an opening 22 and these openings register when the two lugs are in contact. By passing the shackle of a padlock through these openings and locking the padlock, the support is held in its forward position and the machine cannot be used.

When it is desired to use the machine, the padlock is removed, and the support is turned backwardly until it is caught by the spring clip 23, as indicated in Fig. 2. It will be seen that I have thus provided an extremely simple, strong, and light support which cannot get out of order, which fully serve the purpose as a support as well as locking means, and which may be conveniently attached to or removed from the bicycle or motorcycle.

I claim as my invention:

A device of the class described comprising a pair of plates each having an opening adapted to receive the ends of the axle of the machine, and also having inwardly projecting lugs adapted to engage the fork of the machine frame therebetween, and also having an outwardly projecting lug located forwardly of said opening, a U-shaped bar, and a plate secured to each end of said bar, said plate having a rearwardly extending arm pivoted to one of the first-mentioned plates at a point behind the axle opening, and also having a forwardly projecting arm provided with an outwardly extending lug adapted to stop against the first named lug when the bar is swung forwardly, said outwardly projecting lugs having registering openings to receive the shackle of a lock.

In witness whereof I have hereunto affixed my signature in the presence of two witnesses.

FRANK L. EILER.

Witnesses:
C. PAUL PARKER,
GEORGE L. CHINDAHL.

Copies of this patent may be obtained for five cents each, by addressing the "Commissioner of Patents, Washington, D. C."